US008810979B2

(12) United States Patent
Kinsel et al.

(10) Patent No.: US 8,810,979 B2
(45) Date of Patent: *Aug. 19, 2014

(54) METHOD AND APPARATUS FOR SUPERVISORY CIRCUIT FOR GROUND FAULT CIRCUIT INTERRUPT DEVICE

(75) Inventors: Hugh T. Kinsel, Sugar Hill, GA (US); Joselito Endozo, Dacula, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 794 days.

This patent is subject to a terminal disclaimer.

(21) Appl. No.: 13/041,704

(22) Filed: Mar. 7, 2011

(65) Prior Publication Data
US 2011/0222194 A1    Sep. 15, 2011

Related U.S. Application Data

(60) Provisional application No. 61/311,955, filed on Mar. 9, 2010.

(51) Int. Cl.
*H02H 3/00*    (2006.01)
(52) U.S. Cl.
CPC .................................... *H02H 3/355* (2013.01)
USPC .......................................................... 361/42
(58) Field of Classification Search
USPC .......................................................... 361/42
See application file for complete search history.

(56) References Cited

U.S. PATENT DOCUMENTS

| | | | | |
|---|---|---|---|---|
| 4,150,411 A | * | 4/1979 | Howell | 361/45 |
| 4,280,162 A | * | 7/1981 | Tanka et al. | 361/45 |
| 4,685,022 A | * | 8/1987 | Nichols et al. | 361/44 |
| 5,459,630 A | * | 10/1995 | MacKenzie et al. | 361/45 |
| 5,488,303 A | * | 1/1996 | Bagalini | 324/509 |
| 5,796,636 A | | 8/1998 | Andrews | |
| 5,825,599 A | * | 10/1998 | Rosenbaum | 361/45 |
| 6,437,955 B1 | * | 8/2002 | Duffy et al. | 361/45 |
| 6,529,019 B1 | * | 3/2003 | King et al. | 324/754.29 |
| 7,315,437 B2 | | 1/2008 | Bonilla et al. | |
| 7,317,600 B2 | | 1/2008 | Huang et al. | |

(Continued)

FOREIGN PATENT DOCUMENTS

DE    102008006360 B3    7/2009
EP         0220408 A1    5/1987

OTHER PUBLICATIONS

PCT International Search Report dated May 31, 2011 corresponding to PCT Application No. PCT/US2011/027510 filed Mar. 8, 2011 (8 pages).

*Primary Examiner* — Ronald W Leja

(57) ABSTRACT

An apparatus and method for a supervisory circuit for a ground fault detection device or a ground fault circuit interrupt (GFCI) device is disclosed in which a low voltage DC power supply is used to generate a test stimulus signal for a self test of the GFCI device. The GFCI device includes line and neutral conductors configured to connect an AC power source and a load. A differential current transformer includes a toroid, through which the line and neutral conductors pass, and a secondary winding wound on the toroid. A differential ground fault detector is electrically connected to the secondary winding of the differential current transformer to compare current generated in the secondary winding from an imbalance of magnetic flux in the toroid to a trip threshold. A wire conductor is routed through the toroid of the differential current transformer. A controller is configured to control a low voltage DC test stimulus signal to be generated in the wire conductor.

30 Claims, 14 Drawing Sheets

(56) References Cited

U.S. PATENT DOCUMENTS

| | | | |
|---|---|---|---|
| 8,570,181 B2* | 10/2013 | Kinsel et al. ................. 340/650 | |
| 2006/0158798 A1 | 7/2006 | Jackson | |
| 2007/0035898 A1 | 2/2007 | Baldwin et al. | |
| 2008/0239596 A1 | 10/2008 | Restrepo et al. | |
| 2009/0161271 A1 | 6/2009 | Huang et al. | |
| 2010/0013491 A1 | 1/2010 | Hooper et al. | |
| 2011/0216453 A1* | 9/2011 | Haines et al. ................. 361/49 |
| 2011/0222194 A1* | 9/2011 | Kinsel et al. ................. 361/42 |

* cited by examiner

METHOD AND APPARATUS FOR SUPERVISORY CIRCUIT FOR GROUND FAULT CIRCUIT INTERRUPT DEVICE

This application claims the benefit of U.S. Provisional Application No. 61/311,955, filed Mar. 9, 2010, the disclosure of which is herein incorporated by reference.

BACKGROUND OF THE INVENTION

The present invention relates to ground fault detection circuits and more particularly, to testing ground fault detection circuits using a stimulus signal generated using a low voltage DC power supply.

Ground Fault Circuit Interrupt (GFCI) devices detect the presence of ground current faults and grounded neutral faults, and interrupt power in AC power systems if such faults are detected. Accordingly, GFCI devices provide protection from electrocution and are typically used in receptacles in kitchens, bathrooms, and outdoor receptacles where there may be water or moisture that can pose a risk of electrocution. GFCI devices are also used in circuit breakers that protect these same areas of residential buildings. GFCI devices and other devices that detect ground faults and interrupt AC power systems may also be referred to generally as "ground fault detectors". Ground fault detectors typically have supervisory circuits or test circuits that check the functionality of the ground fault detection circuit.

Ground fault detectors disconnect a circuit when current leakage is detected. Current leakage occurs when current flowing through a line, or "hot" conductor, from a source load is diverted to ground without returning to the source. This leakage may result from an accidental short circuit, such as from a defective load attached to the line. If a person touches the load, the leakage current may pass through the person's body to ground, leading to an electric shock. Consequently, ground fault detectors, or GFCIs, act as safety devices and are designed to detect line-to-ground shorts and disconnect the distribution circuit.

Ground fault detectors also need to act quickly. While a typical circuit breaker interrupts a circuit at 20 amperes, it only takes approximately 100 milliamperes to electrocute a person. Therefore, for added safety, ground fault detectors must be able to detect current flow between a line and ground at current levels as little as 6 milliamperes and trip a breaker at the receptacle or at the breaker panel to remove the shock hazard. Ground fault detectors are typically required for receptacles in bathrooms and other areas exposed to water in order to prevent deadly ground fault situations from occurring.

In two-line systems, GFCIs typically detect current leakage by comparing the current flowing in the line and returning in the neutral. A difference in current levels implies that some current has leaked from the circuit and a ground fault exists. GFCIs typically use a differential transformer to detect a difference in the current levels in the line and the neutral. The differential transformer is often a toroidal core that has as its primary windings the line and neutral conductors of the distribution circuit being protected, which are encircled by the core. The secondary windings of the transformer are wrapped around the core. During normal conditions, the current flowing in one direction through the line conductor will return in the opposite direction through the neutral conductor. This balance produces a net current flow of zero through the differential transformer, and the multi-turn winding provides no output. If a fault exists, current leaks from the line conductor to ground and the current flowing back through the line and neutral conductors in the differential transformer will not be equal. This current imbalance will produce uncanceled flux in the differential transformer's core, resulting in an output from the multi-turn secondary winding. Detection circuitry identifies the output from the differential transformer and opens the circuit breaker contacts.

BRIEF SUMMARY OF THE INVENTION

The present invention provides an apparatus and method for a supervisory circuit in a ground fault circuit interrupt (GFCI) device. Embodiments of the present invention utilize a low voltage DC power supply to generate a stimulus signal, which is used for a self test of a GFCI device.

In one embodiment of the present invention, a GFCI device includes line and neutral conductors configured to connect an AC power source and a load. A differential current transformer includes a toroid, through which the line and neutral conductors pass, and a secondary winding wound on the toroid. A differential ground fault detector is electrically connected to the secondary winding of the differential current transformer to compare current generated in the secondary winding from an imbalance of magnetic flux in the toroid to a trip threshold. A wire conductor is routed through the toroid of the differential current transformer. A controller is configured to control a low voltage DC test stimulus signal to be generated in the wire conductor.

According to another embodiment of the present invention, in a method of performing a self test by a GCFI device, a test stimulus signal is generated in a wire conductor routed through a toroid of a differential current transformer from a low voltage DC power supply. It is then determined whether a differential current greater than a trip threshold is detected in the toroid.

These and other advantages of the invention will be apparent to those of ordinary skill in the art by reference to the following detailed description and the accompanying drawings.

DETAILED DESCRIPTION

Figure 1:
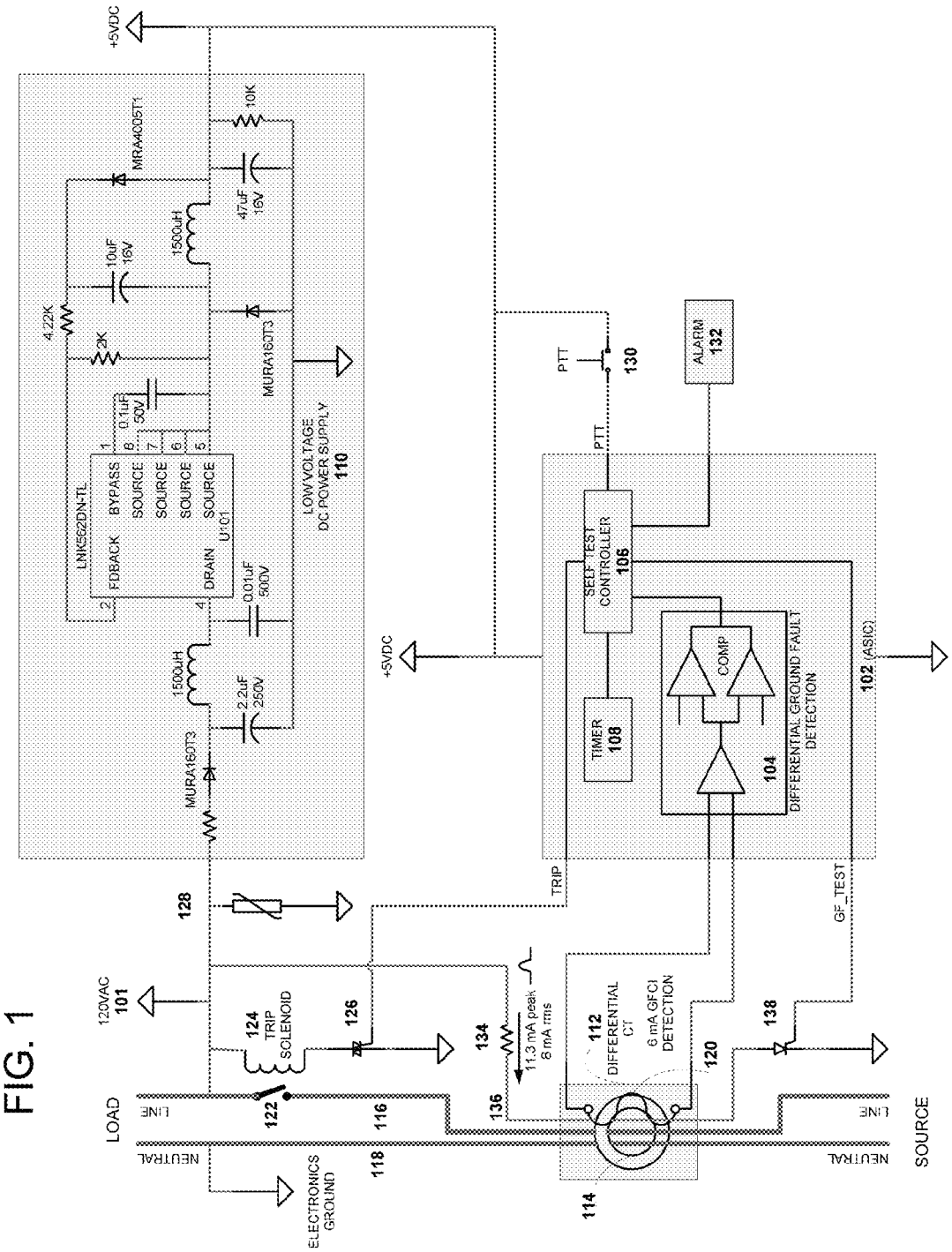
FIG. 1 illustrates a conventional GFCI device with a supervisory test circuit.

The present invention relates to a supervisory circuit for testing Ground Fault Circuit Interrupt (GCFI) devices. Many GFCI devices have a "test" button for verifying the health of a device. Test methods may create a small imbalance by passing a stimulus signal current through the core of the differential transformer. For example, pressing the test button may cause the 120 volt AC power supply to be drawn across a 15 K resistor along a test wire that passes through the differential transformer. In this example, a current of 8 mA (milliamperes rms), which is greater than the 6 mA leakage current detection requirement for GFCI circuits, passes through the differential transformer. The differential transformer and detection circuitry in a properly functioning device would detect the test current as an imbalance and cause the circuit to trip. The tester interprets this result as meaning the circuit breaker device is working safely and correctly. If the circuit breaker does not trip, the tester may assume the circuit has a problem that may be dangerous and require a specialist's attention and possible replacement of the device. Some GFCI devices also include a reset button for resetting the breaker after it has tripped.

In the near future, many GFCI devices may also include auto self test functions that are initiated internally at periodic intervals to verify the health of the device. Such devices consist of a timer and an electromechanical or an electronic switch that electrically connects the 120 volt AC supply across a resistor along a test wire that passes through the differential transformer.

The present inventors have recognized the following problems with conventional supervisory test circuits, whether the test circuit is closed using mechanical switch or an electronic switch. First, conventional test circuits are directly exposed to noise that exists on the line conductor of the AC supply, which can possibly interfere with the test. Second, the AC supply can fluctuate in voltage resulting in a rather large variance of stimulus signal current creating test escape conditions. Third, the test circuit dissipates about 1 watt of power when exercised from a 120 volt AC supply.

With automatic self tests and the use of an electronic switch, the power dissipation of the test circuit becomes more of a problem. Another problem using electronic switches is direct exposure to high voltages on the line conductor of the AC supply. Components with higher rated power and higher rated voltage are larger in size and cost more than components with lower rated power and lower rated voltages.

Embodiments of the present invention provide a supervisory circuit to test ground fault detection circuits by implementing a low voltage DC power supply from which to directly generate a test stimulus signal, typically a current, instead of directly from the line conductor of the 120 volt supply. A low voltage DC power supply provides filtering of any noise present on the line conductor of the 120 volt supply, thus preventing interference with the test from the test stimulus signal itself.

A low voltage DC power supply is typically regulated to within approximately 100 millivolts to provide a constant DC output voltage, thus eliminating any problems caused by large fluctuations in voltage of the AC supply. As a result, the test stimulus signal's current amplitude does not need to be set 15 to 20 percent higher than the rated trip threshold of the ground fault detection circuit to ensure sufficient amplitude, such as when the 120 volt AC supply is 85 percent below rated voltage. This is a test requirement in Underwriters Laboratories (UL) 943 that governs GFCI devices in residential homes. Using a low voltage DC power supply, the test stimulus signal amplitude can be set to closer to the 6 mA rated trip threshold, thus resulting in more consistent repeatable tests that eliminate any possible test escape of a degrading trip threshold.

Power dissipation is reduced in embodiments of the present invention by using a highly efficient switching DC power supply. Power dissipated in the test circuit using a 120 volt AC power supply is approximately 1 watt (120 volts×8 mA=0.96 watts) every time the test circuit is exercised. If an 80 percent efficient switching DC power supply is implemented supplying 5 volts DC and 8.5 milliamperes of DC current (peak amplitude of 6 mA rms sinusoid), then the power dissipated in the test circuit is approximately 53 milliwatts (5 volts×8.5 mA/0.80) every time the test circuit is exercised. Accordingly, in various embodiments of the present invention, components with lower rated power may be utilized in the supervisory test circuit with increased reliability due to lower electrical stress. This may not be much of a concern for devices with push to test only since the test circuit may only be exercised approximately 240 times over the life of the device if the test circuit is exercised once per month as recommended. However, for devices with auto self test, the test circuit may be exercised over 50,000 times over the life of the device.

Electronic switches in test circuits that generate the test signal stimulus directly from the line conductor of a 120 volt AC supply are subjected to transient voltages as high as 400 to 500 volts on the line conductor of a 120 volt AC supply, even with properly designed transient protection circuits that include components such as a transorb or metal-oxide varistor. These transient voltages can be reduced to just a few volts using a DC power supply to generate the test stimulus signal. Hence, an electronic switch and any other components with a much lower voltage rating may be utilized in the supervisory test circuit with increased reliability.

Many ground fault detection devices already utilize a low voltage DC power supply to provide power for the ground fault detection electronic circuits. According to various embodiments of the present invention, it may be convenient to use the same low voltage DC power supply to directly provide the stimulus signal for the test circuit instead of the line conductor of the 120 volt AC supply. Accordingly, since an addition of a low voltage DC power supply is not required for many devices, embodiments of the present invention can be implemented with little or no extra cost or size to the device. Various embodiments of the present invention would likely reduce the size and cost since embodiments of the present invention utilize components with lower rated power and lower rated voltages than components used in conventional devices. Components with lower rated power and lower rated voltage are generally smaller in size and cost less than components with higher rated power and higher rated voltage. Further, an electronic switch with lower rated voltage, and a resistor that sets the current amplitude of the test stimulus signal with a lower power rating could be integrated into a CMOS detection ASIC, saving both size and cost. This can be implemented without adding an extra pin to the ASIC by reusing the pin for the control signal to the electronic switch.

Ground fault detection devices with supervisory test circuits are not just found in GFCI outlets or GFCI circuit breakers in residential buildings. These devices also have applications in protecting commercial and industrial electrical circuits. These devices may be combined with other devices such as AFCI (Arc Fault Circuit Interrupter) detection devices. Ground fault detection devices may be used in any electrical power delivery system or in any electrical equipment. Accordingly, embodiments of the present invention may be implemented in any type of ground fault detection device.

FIG. 1 illustrates a conventional GFCI device 100 with a supervisory test circuit that uses the 120 volt AC power supply 101 to directly generate the test current stimulus voltage. As illustrated in FIG. 1, the conventional GFCI device 100 includes an application-specific integrated circuit (ASIC) 102, which includes a differential ground fault detection circuit 104 and circuitry for a self test, such as a self test controller 106 and a timer 108. The conventional GFCI device 100 further includes a DC power supply 110 to power the ASIC 102. A differential current transformer 112 is built on a toroid 114, with the line conductor 116 and the neutral conductor 118 passing through the toroid 114 and a secondary winding 120 wound on the toroid 114. A main mechanical contact switch 122 is provided in the line conductor 116, and a trip solenoid 124 and accompanying electrical switch 126 are used to trip the main mechanical contact switch 122. A high current transient voltage suppressor component 128 is electrically connected from the line conductor 116 to the neutral conductor 118, which in this case is also an electronics ground. A PTT (Push-To-Test) button 130 can be pushed by an operator to initiate a self test. An alarm 132 alerts the operator of an automatic self test failure. The supervisory test circuit of the GFCI device 100 is comprised of a resistor 134, a third wire 136 passing through the toroid 114 of the transformer 112, and an electronic switch 138.

Basic function of the GFCI device 100 of FIG. 1 is as follows. Current leaking from the line conductor 116 on the load side of the main mechanical contact switch 122 of the device back to ground, or to neutral on the source side of the device through some path other than the neutral conductor 118, creates an imbalance of magnetic flux in the toroid 114 of the differential current transformer 112, causing a current to flow in the secondary windings 120. The terminals of the secondary winding 120 are electrically connected to input pins of the differential ground fault detection circuit 104 contained in an ASIC 102. A typical detection circuit amplifies the input current signal and compares the amplitude to a predetermined trip threshold. In devices that have automatic self test, the self test controller 106 allows or inhibits the output signal of the detector 104 to pass through to an output pin of the ASIC 102. In particular, if a self test is not being performed, the self test controller 106 allows the output signal to pass through to the output pin of the ASIC 102. The output pin of the ASIC 102 is electrically connected to a control pin of the electronic switch 126, and the output signal (TRIP) is transmitted to the electronic switch 126. One terminal of the electronic switch 126 is electrically connected to the electronics ground. The other terminal of the electronic switch 126 is electrically connected to one terminal of the trip solenoid 124. The other terminal of the trip solenoid 124 is electrically connected to the line conductor 116 of the 120 volts AC power supply 101 on the load side of main contact switch 122. Trip solenoid 124 is mechanically located to activate a trip armature that opens the main contact switch 122 in the line conductor 116 when energized.

During normal ground fault detection mode, the control circuit allows the output signal of the detector 104 to pass through to an output pin of the ASIC 102. In the case that the detected differential current exceeds the predetermined trip threshold, the output signal (TRIP) turns on or closes the electronic switch 126 which energizes the trip solenoid 124. The trip solenoid 124 activates the trip armature that opens the main contact 122 which interrupts delivery of the 120 volts AC power supply 101 in the line conductor 116 to the load.

The supervisory test circuit serves to test the health of the ground fault detection device 100. A test may be initiated by the operator by pressing the push-to-test button 130 or may be initiated automatically at periodic time intervals triggered by the timer 108. The self test controller 106 monitors the push-to-test pin of the ASIC 102 and the timer 108. One terminal of the PTT button 130 is electrically connected to the push-to-test pin of the ASIC 102. The other terminal of the PTT button 130 is electrically connected to the DC power supply 110. The PTT circuit can alternatively be configured such that the other terminal is connected to electronics ground for an active PTT. The control circuit outputs a signal (GF_TEST) on a pin of the ASIC 102 which is electrically connected to the control pin of electronic switch 138. One terminal of the electronic switch 138 is electrically connected to an electronics ground. The other terminal of the electronic switch 138 is electrically connected to one terminal of resistor 134 using a wire conductor 136 that is routed through the toroid 114 of the differential current transformer 112. The other terminal of the resistor 134 is electrically connected to the line conductor of the 120 volts AC power supply 101 on the load side of main contact switch 122. Even with the high current transient voltage suppressor component 128 electrically connected from the line conductor 116 to the neutral conductor 118, the supervisory circuit can be exposed to transient voltages with amplitudes of 500 to 600 volts. The supervisory circuit can also be exposed to other low voltage noise on the line conductor that could potentially interfere with the self test.

In the case in which the test is initiated by an operator pressing the push-to-test button 130, the self test controller 106 transmits a signal (GF_TEST) to turn on or close the electronic switch 138. For example, the particular electronic switch 138 in FIG. 1 can be a silicon controlled rectifier (SCR). This switch was selected based on a high voltage rating of 600 volts to withstand voltages in the line conductor of the 120 volts AC supply 101, and on a package type of SOT-89, which is one of the smallest size surface mount package offered for such a high voltage rated component. The electronic switch 138 behaves like a gate controlled diode, except that the switch 138 will stay on once it is turned on for as long as there is a voltage potential drop from the anode to the cathode, even if the gate voltage is removed. Turning on or closing the electronic switch 138 causes a current signal to flow directly from the line conductor of 120 volt AC supply 101 through resistor 134 and wire 136 which is routed through the toroid 114 of the transformer 112, and through the electronic switch 138 to electronics ground during the positive half cycle of the 120 volt AC supply. The amplitude of the test current stimulus signal is set by resistor 134 to a value at least 30% above the trip threshold of the differential ground fault detection circuit 104 in the ASIC 102. For a GFCI device which has a rated trip current of 6 milliamperes rms, or 8.5 milliamperes peak, the amplitude of the test current is set to just above 8 milliamperes rms, or 11.3 milliamperes peak. This is to guarantee detection with margin when the line conductor of the 120 volts AC supply 101 drops to 85%. Intentionally passing the stimulus current through the toroid 114 of the transformer 112 creates an imbalance of magnetic flux in the toroid 114 of the differential current transformer 112, causing a current to flow in the secondary windings 120. The current in the secondary windings 120 is detected by the ground fault detector circuit 104 in the ASIC 102.

During a push-to-test, the self test controller 106 can allow the output signal of the detector 104 to pass through to an output pin of the ASIC 102. The test current stimulus signal generated by the supervisory test circuit results in a detected differential current that exceeds the predetermined trip threshold. The detector output signal (TRIP) turns on or closes electronic switch 126 which energizes the trip solenoid 124. The trip solenoid 124 activates a trip armature that opens the main contact switch 122, which interrupts delivery of the 120 volts AC power supply 101 in the line conductor 116 to the load. Typically, a mechanical switch arm moves from the ON position to a TRIP position, indicating to the operator that the push-to-test has passed. Otherwise, there is no tripping action, indicating to the operator that the push-to-test has failed.

During an automatic self test, the self test controller 106 inhibits the output signal of the detector 104 from passing through to an output pin of the ASIC 102. The test current stimulus signal generated by the supervisory test circuit results in a detected differential current that exceeds the predetermined trip threshold. The detector output signal is inhibited by the self test controller 106, preventing the electronic switch 126 from closing and energizing the trip solenoid 124. Instead, normal operation is resumed. Otherwise, if no differential current is detected that exceeds the predetermined trip threshold after a predetermined elapsed period of time, the control circuit sends a signal to the alarm circuit 132 to alert the operator that the ground fault device is defective and needs to be replaced.

Figure 2:
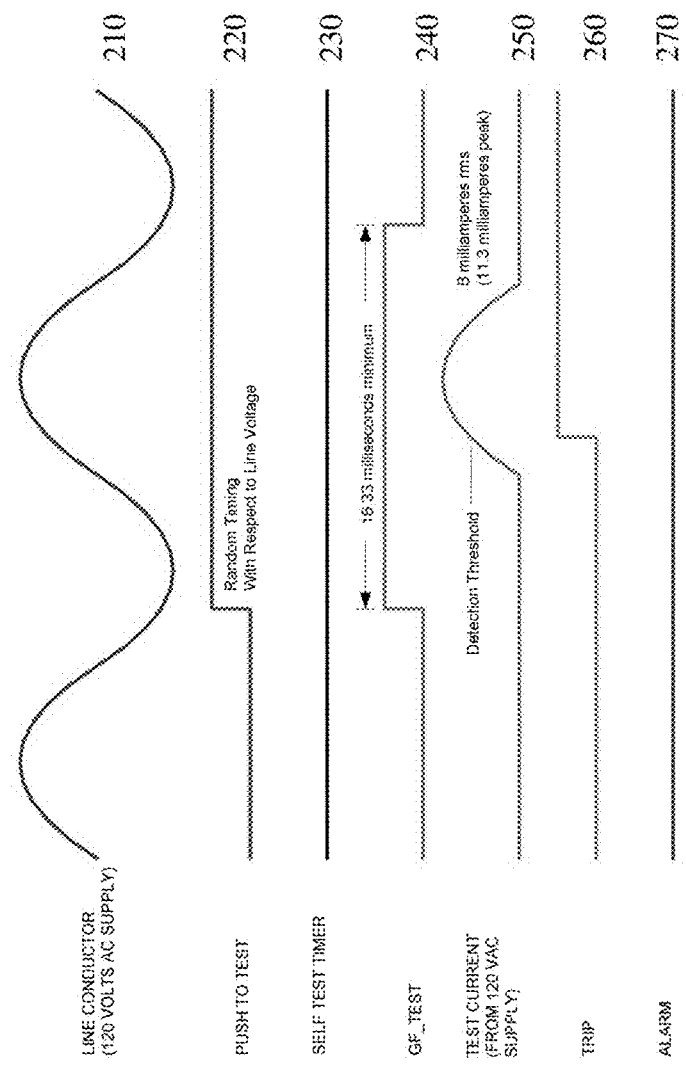
FIG. 2 illustrates a signal timing diagram of the push-to-test self test for the GFCI device of FIG. 1.

FIG. 2 illustrates a signal timing diagram of the push-to-test self test for the GFCI device 100 of FIG. 1. In particular, FIG. 2 shows the line conductor signal 210 of the 120 volts AC power supply 101, the push-to-test signal 220, the self test timer signal 230, the GF_TEST signal 240, the test current 250 from the AC power supply 101, the TRIP signal 260, and the ALARM signal 270 for the case in which the GFCI device 100 performs a push-to-test self test. Referring to FIGS. 1 and 2, the push-to-test signal 220 is initiated by an operator pushing the PTT button 130 at a random phase of the line conductor 210. The GF_TEST signal 240 is then generated by the self test controller 106 which closes the electronic switch 138 resulting in a test current stimulus signal 250 during the positive half cycle of the line conductor signal 210. Therefore, the GF_TEST signal 240 should be present for at least one complete cycle (e.g., 16.33 milliseconds) of the line conductor signal 210 to guarantee that a test current stimulus signal 250 will be generated during the positive half cycle of the line conductor signal to test the ground fault detection circuit. Once the test current signal 250 exceeds the detection threshold of the ground fault detector 104, the detector 104 outputs the TRIP signal 260 to trip the circuit breaker (e.g., switch 126).

Figure 3:
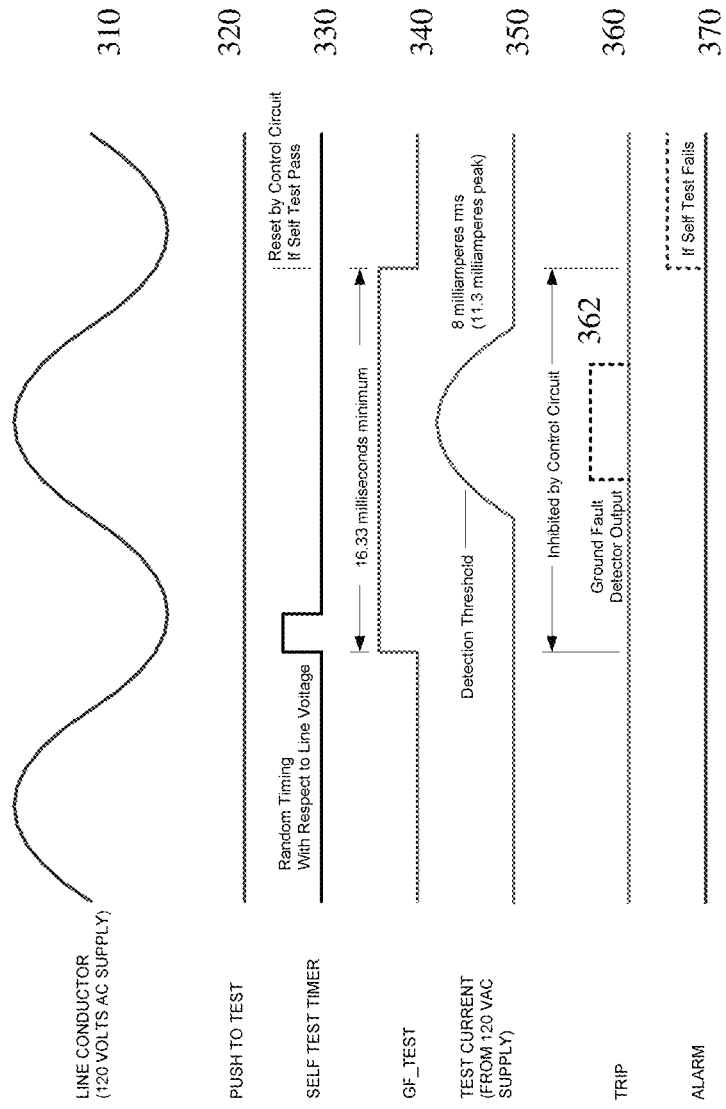
FIG. 3 illustrates a signal timing diagram of an automatic self test for the GFCI device of FIG. 1.

FIG. 3 illustrates a signal timing diagram of an automatic self test for the GFCI device 100 of FIG. 1. In particular, FIG. 3 shows the line conductor signal 310 of the 120 volts AC power supply 101, the push-to-test signal 320, the self test timer signal 330, the GF_TEST signal 340, the test current 350 from the AC power supply 101, the TRIP signal 360, and the ALARM signal 370 for the case in which the GFCI device 100 performs an automatic self test. Referring to FIGS. 1 and 3, the self test timer 108 transmits a self test timer signal 330 initiating a self test at a random phase of the line conductor 310. The GF_TEST signal 340 is then generated by the self test controller 106 and closes the electronic switch 138 resulting in a test current stimulus signal 350 during the positive half cycle of the line conductor signal 310. Therefore, the GF_TEST signal 340 should be present for at least one complete cycle (e.g., 16.33 milliseconds) of the line conductor signal 310 to guarantee that the test current stimulus signal 350 will be generated during the positive half cycle of the line conductor signal 310 to test the ground fault detection circuit. Once the test current signal 350 exceeds the detection threshold of the ground fault detector 104, the detector 104 outputs a signal 362 that is inhibited by the self test controller 106 from reaching the TRIP signal output. However, the self test controller 106 utilizes this signal 362 as a self test pass indicator. At the end of the complete cycle self test period, if the self test passed, the self test controller 106 resets the self test timer 108 and again enables the output of the ground fault detector 104 to the output pin of the ASIC. Otherwise, if the self-test fails, the self-test controller outputs an ALARM 370 signal to the alarm circuit 132 to alert the operator of a self test failure.

Figure 4:
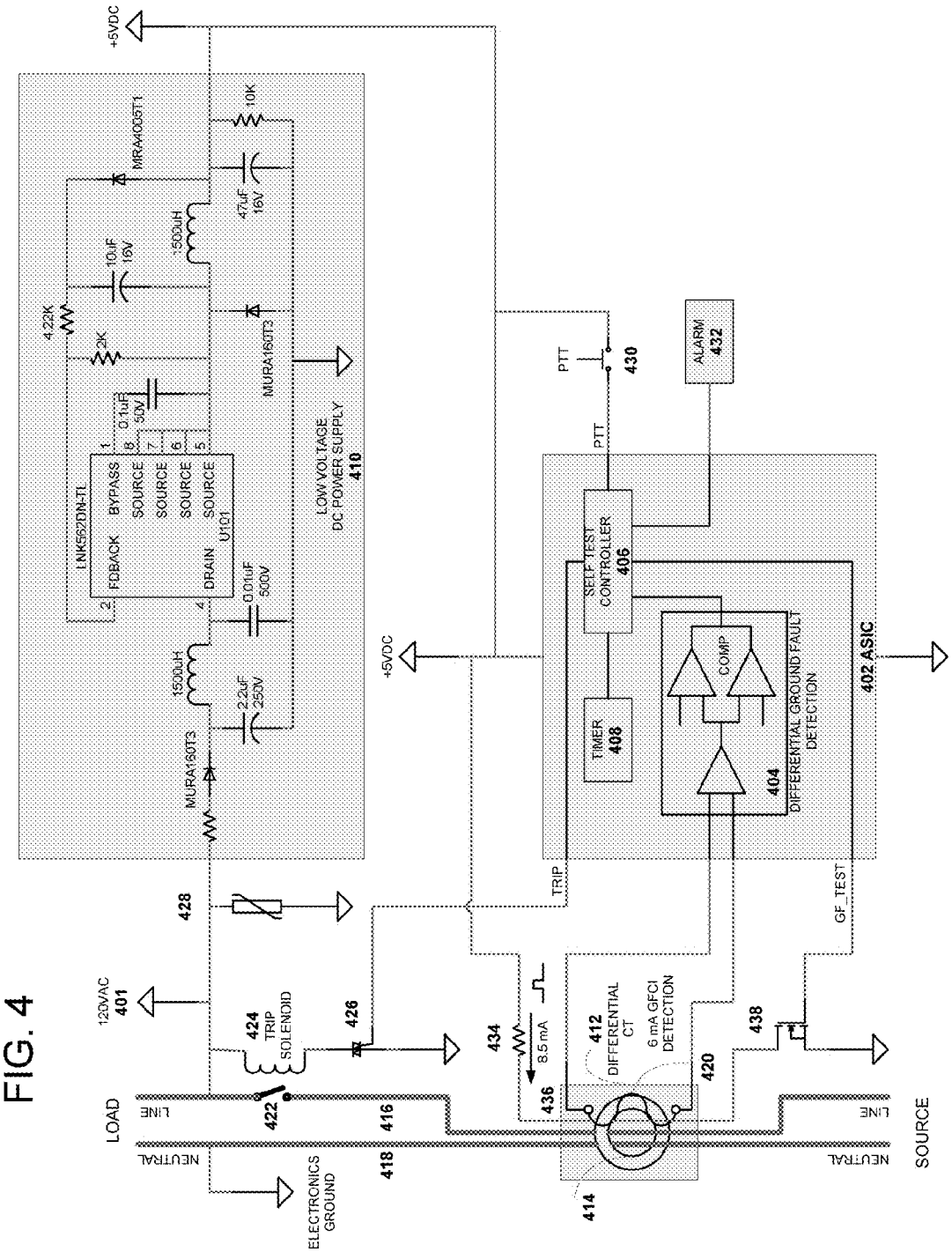
FIG. 4 illustrates a GFCI device according to an embodiment of the present invention.

FIG. 4 illustrates a GFCI device 400, according to an embodiment of the present invention, that uses a low voltage DC power supply 410 to directly generate a test current stimulus signal. As illustrated in FIG. 4, the GFCI device 400 includes an ASIC 402, which includes a differential ground fault detection circuit 404 and circuitry for a self test, such as a self test controller 406 and a timer 408. The GFCI device 400 further includes a DC power supply 410 to power the ASIC 402 and to directly generate the test current stimulus signal. A differential current transformer 412 is built on a toroid 414, with the line conductor 416 and the neutral conductor 418 passing through the toroid 414 and a secondary winding 420 wound on the toroid 414. A main mechanical contact switch 422 is provided in the line conductor 416, and a trip solenoid 424 and accompanying electrical switch 426 are used to trip the main mechanical contact switch 422. A high current transient voltage suppressor component 428 is electrically connected from the line conductor 416 to the neutral conductor 418, which in the case is also the electronics ground. A PTT (Push-To-Test) button 430 can be pushed by an operator to initiate a self test. An alarm 432 alerts the operator of an automatic self test failure. The supervisory test circuit of the GFCI device 400 is comprised of a resistor 434, a third wire 436 passing through the toroid 414 of the transformer 412, and an electronic switch 438.

According to an embodiment of the present invention, basic function of the GFCI device 400 of FIG. 4 is as follows. Current leaking from the line conductor 416 on the load side of the main mechanical contact switch 422 of the device back to ground, or to neutral on the source side of the device through some path other than the neutral conductor 418, creates an imbalance of magnetic flux in the toroid 414 of the differential current transformer 412, causing a current to flow in the secondary windings 420. The terminals of the secondary winding 420 are electrically connected to input pins of the differential ground fault detection circuit 404 contained in an ASIC 402. According to an advantageous implementation, the detection circuit 404 may amplify the input current signal and compare the amplitude to a predetermined trip threshold. In devices that have automatic self test, the self test controller 406 allows or inhibits the output signal of the detector 404 to pass through to an output pin of the ASIC 402. In particular, if an automatic self test is not being performed, the self test controller 406 allows the output signal to pass through to the output pin of the ASIC 402. The output pin of the ASIC 402 is electrically connected to a control pin of the electronic switch 426, and the output signal (TRIP) is transmitted to the electronic switch 426. One terminal of the electronic switch 426 is electrically connected to the electronics ground. The other terminal of the electronic switch 426 is electrically connected to one terminal of the trip solenoid 424. The other terminal of the trip solenoid 424 is electrically connected to the line conductor 416 of an AC power supply 401 on the load side of main contact switch 422. Trip solenoid 424 is mechanically located to activate a trip armature that opens the main contact switch 422 in the line conductor 416 when energized.

During normal ground fault detection mode, the self test controller 406 allows the output signal of the detector 404 to pass through to an output pin of the ASIC 402. In the case that the detected differential current exceeds the predetermined trip threshold, the output signal (TRIP) turns on or closes the electronic switch 426 which energizes the trip solenoid 424. The trip solenoid 424 activates the trip armature that opens the main contact 422 which interrupts delivery of the AC power supply 401 in the line conductor 416 to the load.

The supervisory test circuit serves to test the health of the ground fault detection device 400. A test may be initiated by the operator by pressing the push-to-test button 430 or may be initiated automatically at periodic time intervals triggered by the timer 408. The self test controller 406 monitors the push-to-test pin of the ASIC 402 and the timer 408. One terminal of the PTT button 430 is electrically connected to the push-to-test pin of the ASIC 402. The other terminal of the PTT button 430 is electrically connected to the DC power supply 410 (+5 VDC). The control circuit outputs a signal (GF_TEST) on a pin of the ASIC 402 which is electrically connected to the control pin of electronic switch 438. One terminal of the electronic switch 438 is electrically connected to an electronics ground. The other terminal of the electronic switch 438 is electrically connected to one terminal of resistor 434 using a wire conductor 436 that is routed through the toroid 414 of the differential current transformer 412. The other terminal of the resistor 434 is electrically connected to the low voltage DC power supply 410. In the embodiment of FIG. 4, the low voltage DC power supply 410 supplies +5 VDC, but the present invention is not limited thereto. The low voltage DC power supply 410 can be a bridge rectifier that converts AC power from the AC power supply 401 to DC power 402. The low voltage DC power supply 410 can be implemented as a half wave rectifier, as shown in FIG. 4, but the present invention is not limited thereto. The low voltage DC power supply 410 filters the high voltage transients as well as other low voltage noise on the line conductor 416 that could potentially interfere with the self test.

In the case in which the test is initiated by an operator pressing the push-to-test button 430, the self test controller 406 transmits a signal (GF_TEST) to turn on or close the electronic switch 438. According to an advantageous implementation, the electronic switch 438 in FIG. 4 can be implemented as SI1902, a dual N-channel MOSFET manufactured by Vishay Siliconix. The part was selected by the present inventors based on a much lower voltage rating requirement of 10 to 20 volts to withstand any transient voltages that leaked through the low voltage DC power supply 410 from the line conductor of the 120 volts AC supply 401, and comes in a very small package type SOT-363, which is 2.1 millimeters by 2 millimeters. This is a much smaller package than the SOT-89 for the SCR used in the conventional GFCI device of FIG. 1, which is 4.6 millimeters by 4.25 millimeters. Further, the SI1902 costs less than the SCR, which could lead to large cost savings over large quantities in production. The SI1902 electronic switch behaves like a normal switch in that it is on or closed when there is gate voltage, and is off or open when the gate voltage is removed. It is to be understood that the present invention is not limited to the use of the SI1902 electronic switch, and the above description of the SI1902 electronic switch illustrates that in embodiments of the present invention in which the stimulus signal is generated from a low voltage DC power supply, an electronic switch can be used that has a lower voltage rating, cheaper price, and smaller package, as compared with the conventional GFCI device.

Turning on or closing the electronic switch 438 causes a current signal to flow directly from the low voltage DC power supply 410 through resistor 434 and wire 436 which is routed through the toroid 414 of the transformer 412, and through the electronic switch 438 to electronics ground. The amplitude of the test current stimulus signal is set by resistor 434 to a value that is slightly above the trip threshold of the differential ground fault detection circuit 404 in the ASIC 402. For a GFCI device which has a rated trip current of 6 milliamperes rms, or 8.5 milliamperes peak, the amplitude of the test current is set to just above 8.5 milliamperes DC. It can be noted that any component that provides a resistance can be used as the resistor 434 to set the amplitude of the test current stimulus signal. For example, in place a traditional resistor, a field-effect transistor (FET) biased in the linear region to form a resistance could be used as the resistor 434 to set the amplitude of the test current stimulus signal. Since the test current is directly generated from the low voltage DC power supply 410, the amplitude of the test current stimulus signal remains constant when the line conductor 416 of the 120 volts AC power supply 401 drops to 85%. Accordingly, there is no need to set the amplitude of the test current stimulus signal at least 30% above the trip threshold of the differential ground fault detection circuit 404 in the ASIC 402, as in the conventional GFCI device, to guarantee detection with margin when the line conductor of the 120 volts AC supply drops to 85%. This eliminates the possibility of a test escape in that if the trip threshold of the differential ground fault detection circuit 404 in the ASIC 402 degrades by 20%, the self test will fail, as it should. In the conventional GFCI device of FIG. 1, the self test could still pass even though the ground fault detection device degraded to a point that is noncompliant with UL (Underwriters Laboratory) requirements. The amount of momentary power dissipated in the supervisory circuit is reduced from 960 milliwatts in the conventional GFCI device of FIG. 1 to 43 milliwatts in the GFCI device 400 of FIG. 4. This allows one to use lower power rated components for the resistor 434 and the electronic switch 438 and still improve component reliability. This is important for devices that include automatic self test since the supervisory test circuit will be exercised periodically over 50,000 times over a lifetime of 20 years. Intentionally passing the stimulus current through the toroid 414 of the transformer 412 creates an imbalance of magnetic flux in the toroid 414 of the differential current transformer 412, causing a current to flow in the secondary windings 420. The current in the secondary windings 420 is detected by the ground fault detector circuit 404 in the ASIC 402.

During a push-to-test, the self test controller 406 can allow the output signal of the detector 404 to pass through to an output pin of the ASIC 402. The test current stimulus signal generated by the supervisory test circuit results in a detected differential current that exceeds the predetermined trip threshold. The detector output signal (TRIP) turns on or closes electronic switch 426 which energizes the trip solenoid 424. The trip solenoid 424 activates a trip armature that opens the main contact switch 422, which interrupts delivery of the 420 volts AC power supply 401 in the line conductor 416 to the load. Typically, a mechanical switch arm moves from the ON position to a TRIP position, indicating to the operator that the push-to-test has passed. Otherwise, there is no tripping action, indicating to the operator that the push-to-test has failed.

During an automatic self test, the self test controller 406 inhibits the output signal of the detector 404 from passing through to an output pin of the ASIC 402. The test current stimulus signal generated by the supervisory test circuit results in a detected differential current that exceeds the predetermined trip threshold. The detector output signal is inhibited by the self test controller 406, preventing the electronic switch 426 from closing and energizing the trip solenoid 424. Instead, normal operation is resumed. Otherwise, if no differential current is detected that exceeds the predetermined trip threshold after a predetermined elapsed period of time, the control circuit sends a signal to the alarm circuit 432 to alert the operator that the ground fault device is defective and needs to be replaced.

Figure 5:
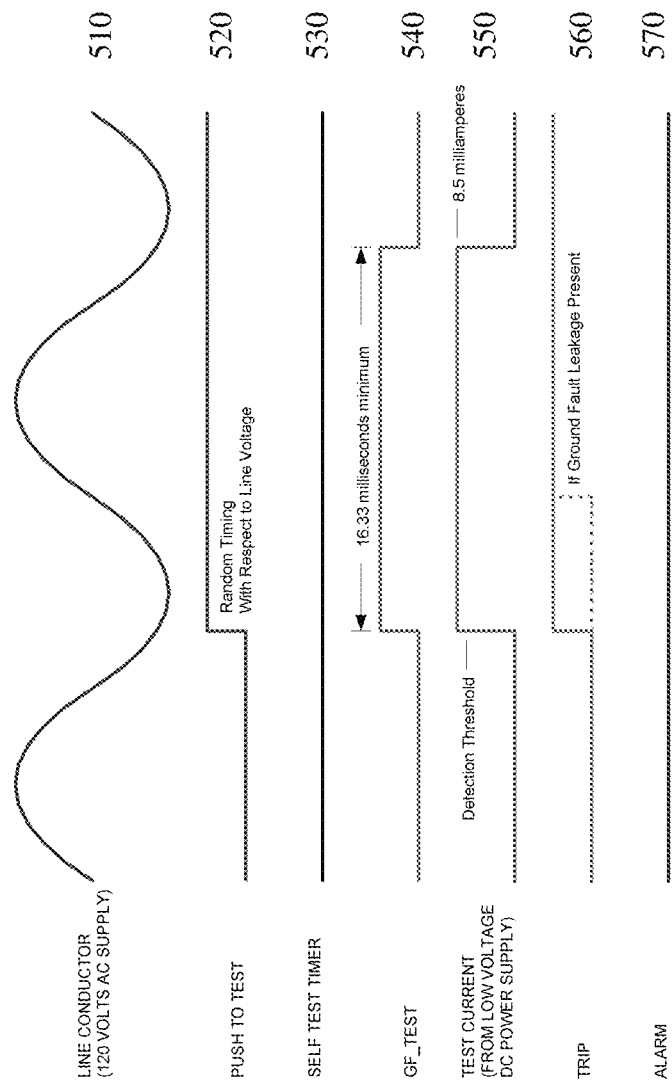
FIG. 5 illustrates a signal timing diagram of the push-to-test self test for the GFCI device of the embodiment of FIG. 4.

FIG. 5 illustrates a signal timing diagram of the push-to-test self test for the GFCI device 400 of the embodiment of FIG. 4. In particular, FIG. 5 shows the line conductor signal 510 of the 120 volts AC power supply 501, the push-to-test signal 520, the self test timer signal 530, the GF_TEST signal 540, the test current 550 from the low voltage DC power supply 410, the TRIP signal 560, and the ALARM signal 570 for the case in which the GFCI device 400 performs a push-to-test self test. Referring to FIGS. 4 and 5, the push-to-test signal 520 is initiated by an operator pushing the PTT button 430 at a random phase of the line conductor signal 510. The GF_TEST signal 540 is then generated by the self test controller 406 which closes the electronic switch 438 of the supervisory test circuit resulting in a test current stimulus signal 550 (e.g., 8.5 milliamperes) on wire 436 from the low voltage DC power source 410. The GF_TEST signal 540 should be present for at least one complete cycle (e.g., 16.33 milliseconds) of the line conductor signal 510 to guarantee that a test current stimulus signal 550 will be generated that exceeds the trip threshold to test the ground fault detection circuit in case there is any minimal leakage of ground fault current (less than 6 milliamperes rms, 8.5 milliamperes peak) during the negative half cycle. Once the test current signal 550 exceeds the detection threshold of the ground fault detector 404, the detector 404 outputs the TRIP signal 560 to trip the circuit breaker (e.g., switch 426).

Figure 6:
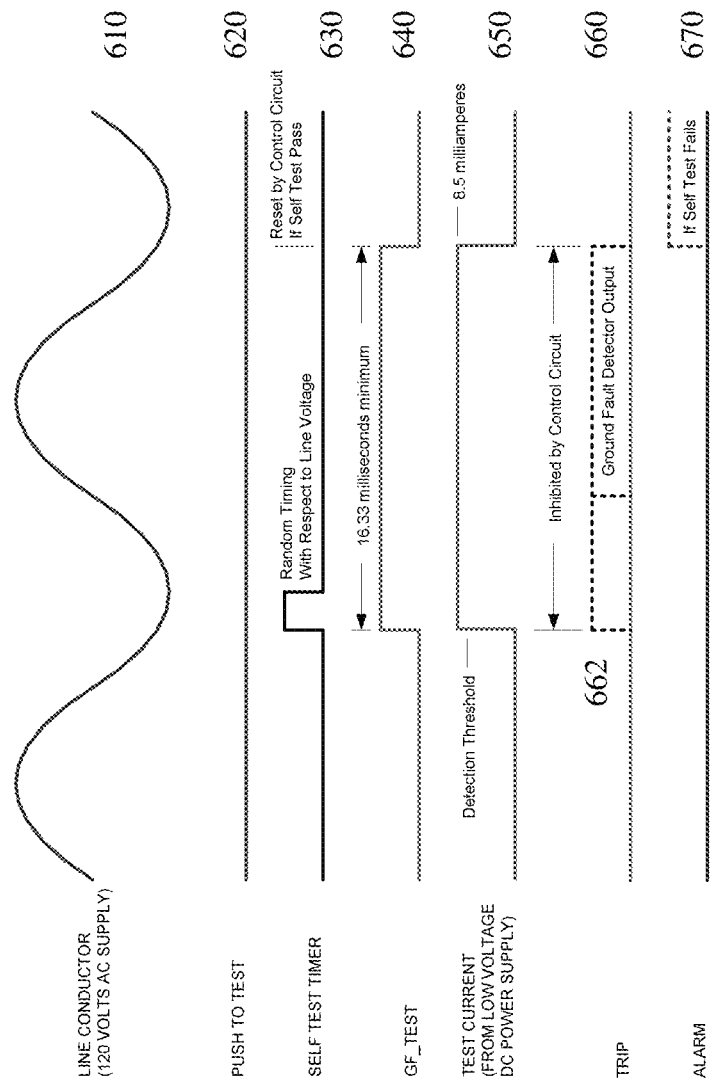
FIG. 6 illustrates a signal timing diagram of an automatic self test for the GFCI device according to the embodiment of FIG. 4.

FIG. 6 illustrates a signal timing diagram of an automatic self test for the GFCI device 400 according to the embodiment of FIG. 4. In particular, FIG. 6 shows the line conductor signal 610 of the 120 volts AC power supply 401, the push-to-test signal 620, the self test timer signal 630, the GF_TEST signal 640, the test current 650 from the low voltage DC power supply 410, the TRIP signal 660, and the ALARM signal 670 for the case in which the GFCI device 400 performs an automatic self test. Referring to FIGS. 4 and 6, the self test timer 408 transmits a self test timer signal 630 initiating a self test at a random phase of the line conductor signal 610. The GF_TEST signal 640 is then generated by the self test controller 406 and closes the electronic switch 438 resulting in a test current stimulus signal 650 (e.g., 8.5 milliamperes) on wire 436 from the low voltage DC power source 410. The GF_TEST signal 640 should be present for at least one complete cycle (e.g., 16.33 milliseconds) of the line conductor signal 610 to guarantee that a test current stimulus signal 650 will be generated that exceeds the trip threshold in case there is any minimal leakage of ground fault current (less than 6 milliamperes rms, 8.5 milliamperes peak) during the negative half cycle. Once the test current signal 650 exceeds the detection threshold of the ground fault detector 404, the detector 404 outputs a signal 662 that is inhibited by the self test controller 406 from reaching the TRIP signal output. However, the self test controller 406 utilizes this signal 662 as a self test pass indicator. At the end of the complete cycle self test period, if the self test passed, the self test controller 406 resets the self test timer 408 and again enables the output of the ground fault detector 404 to the output pin of the ASIC. Otherwise, if the self-test fails, the self-test controller 406 outputs an ALARM signal 670 to the alarm circuit 432 to alert the operator of a self test failure.

Figure 7:
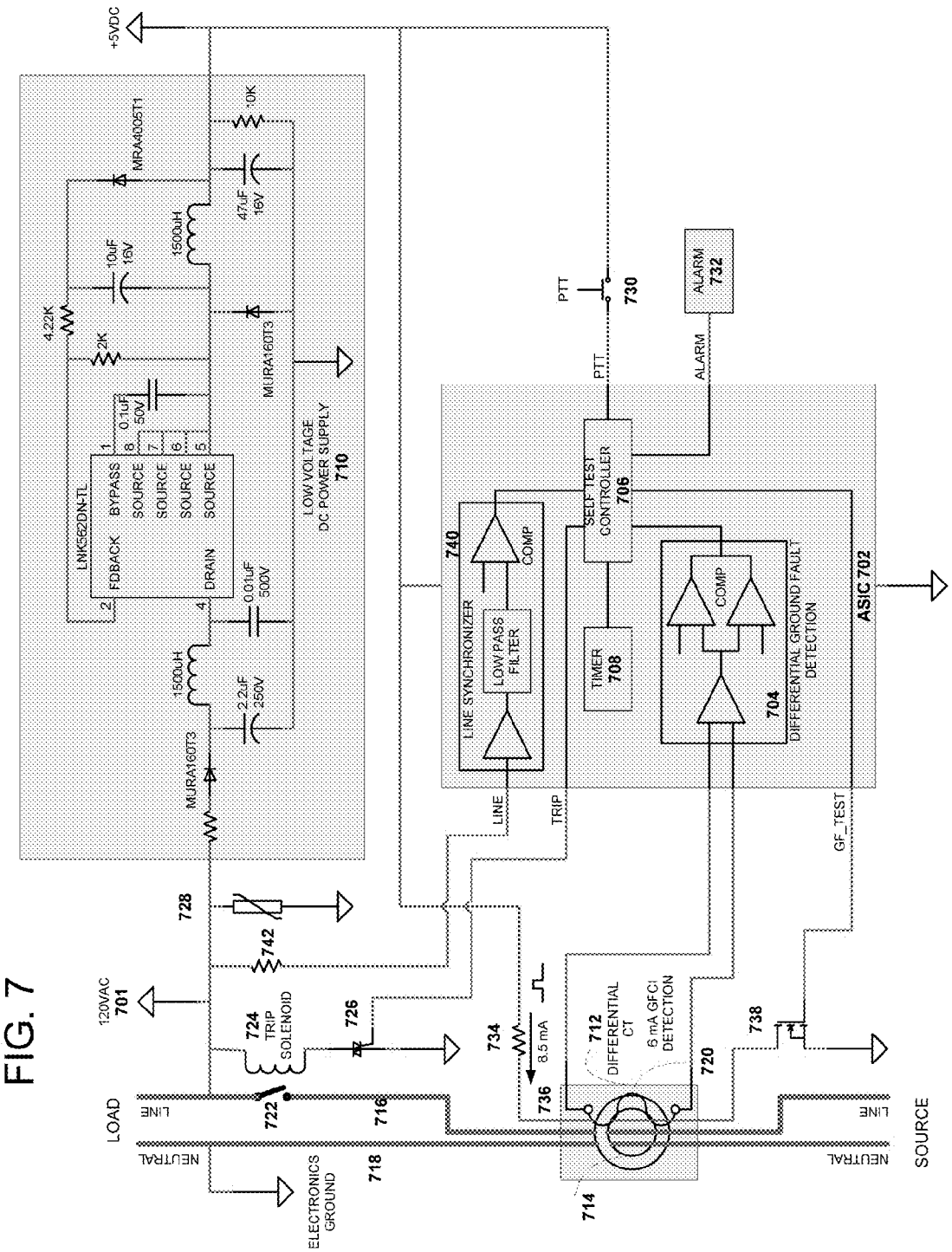
FIG. 7 illustrates a GFCI device according to another embodiment of the present invention.

FIG. 7 illustrates a GFCI device 700, according to another embodiment of the present invention. In the embodiment of FIG. 7, the required duration of the test current stimulus signal can be reduced from a complete cycle (e.g., 16.33 milliseconds) of the line conductor 716 of the AC power supply 701 to a few milliseconds by synchronizing the test current stimulus signal to the line conductor of 716 of the AC power supply 701. The components 701-738 of the GFCI device 700 of FIG. 7 operate similarly to the respective components 401-438 of the GFCI device 400 of FIG. 4 described above, other than the following differences described hereinafter.

The GFCI device 700 of FIG. 7 is similar to the GFCI device 400 of FIG. 4, but includes a resistor 742 that electrically couples the line conductor voltage of the AC power supply 701 to the ASIC 702. The ASIC 702 includes a line synchronizer circuit 740 to synchronize the test current stimulus signal to the line conductor of the AC power supply 701. One terminal of resistor 742 is electrically connected to the LINE conductor of the 120 volt AC supply 701. The other terminal is electrically connected to a pin of the ASIC 702 that is input into the line synchronizer circuit 740 The line synchronizer circuit 740 outputs a signal to the self test controller 706 when the amplitude exceeds a predetermined threshold during the positive half cycle of the line conductor of the 120 volt AC power supply 701. It is to be understood, that the line synchronizer circuit 740 can output the signal to the self test controller 706 when the amplitude exceeds a predetermined threshold during the negative half cycle of the line conductor of the 120 volt AC power supply 701, in a cased in which the wire conductor 736 is routed in the opposite direction through the toroid 714 of the transformer 712. The self test controller 706 utilizes this signal to determine when to generate the GF_TEST signal during a self test. In the embodiment of FIG. 7, the push-to-test self test and the automatic self test operate in a similar manner as described above with respect to FIG. 4. However, the timing diagram is different with the self test controller 706 utilizing the output signal from the line synchronizer circuit 740, as in the embodiment of FIG. 7.

Figure 8:
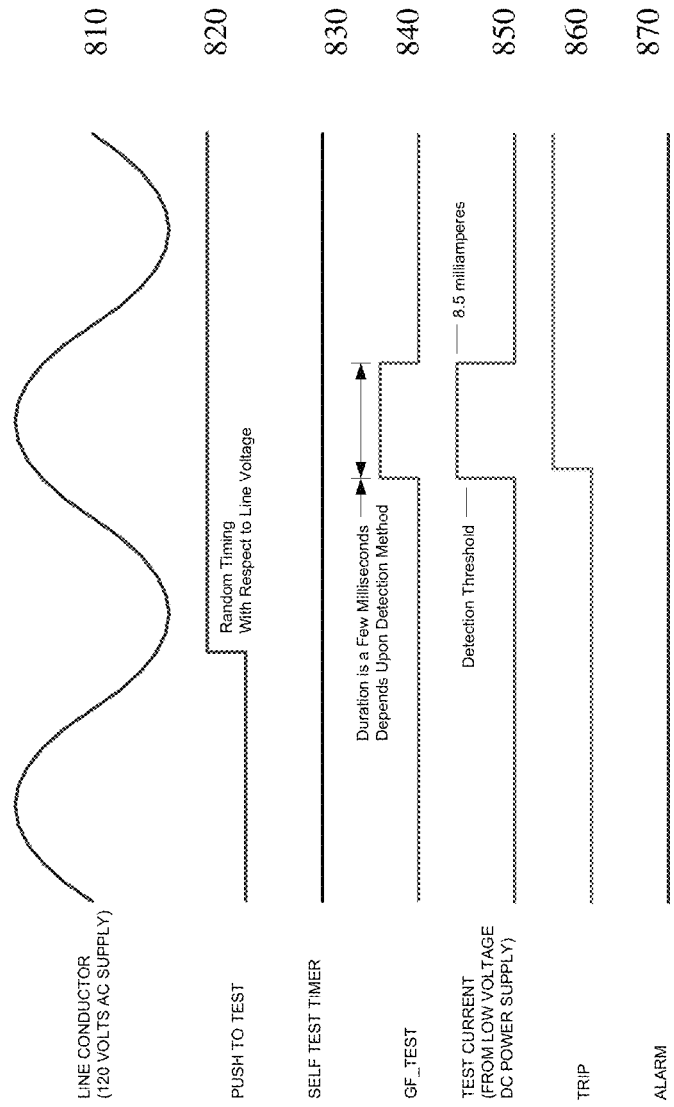
FIG. 8 illustrates a signal timing diagram of the push-to-test self test for the GFCI device of the embodiment of FIG. 7.

FIG. 8 illustrates a signal timing diagram of the push-to-test self test for the GFCI device 700 of the embodiment of FIG. 7. In particular, FIG. 8 shows the line conductor signal 810 of the 120 volts AC power supply 701, the push-to-test signal 820, the self test timer signal 830, the GF_TEST signal 840, the test current 850 from the low voltage DC power supply 710, the TRIP signal 860, and the ALARM signal 870 for the case in which the GFCI device 700 performs a push-to-test self test. Referring to FIGS. 7 and 8, the push-to-test signal 820 is initiated by an operator pushing the PTT button 730 at a random phase of the line conductor signal 810. The GF_TEST signal 840 is then generated by the self test controller 706 which closes the electronic switch 738 of the supervisory test circuit resulting in a test current stimulus signal 850 (e.g., 8.5 milliamperes) on wire 736 from the low voltage DC power source 710. The self test controller 706 gates the output signal from the line synchronizer circuit 740 so that the GF_TEST signal is present for only a few milliseconds during the positive half cycle of the line conductor signal 810 of the AC power supply 701. This is the optimal time to generate the test current stimulus signal 850. It is to be understood that in an alternative embodiment, the GF_Test signal could be present during the negative half cycle of the line conductor signal, in a case in which the wire conductor 736 is routed in the opposite direction through the toroid 714. Once the test current signal 850 exceeds the detection threshold of the ground fault detector 704, the detector 704 outputs the TRIP signal 860 to trip the circuit breaker (e.g., switch 726).

Figure 9:
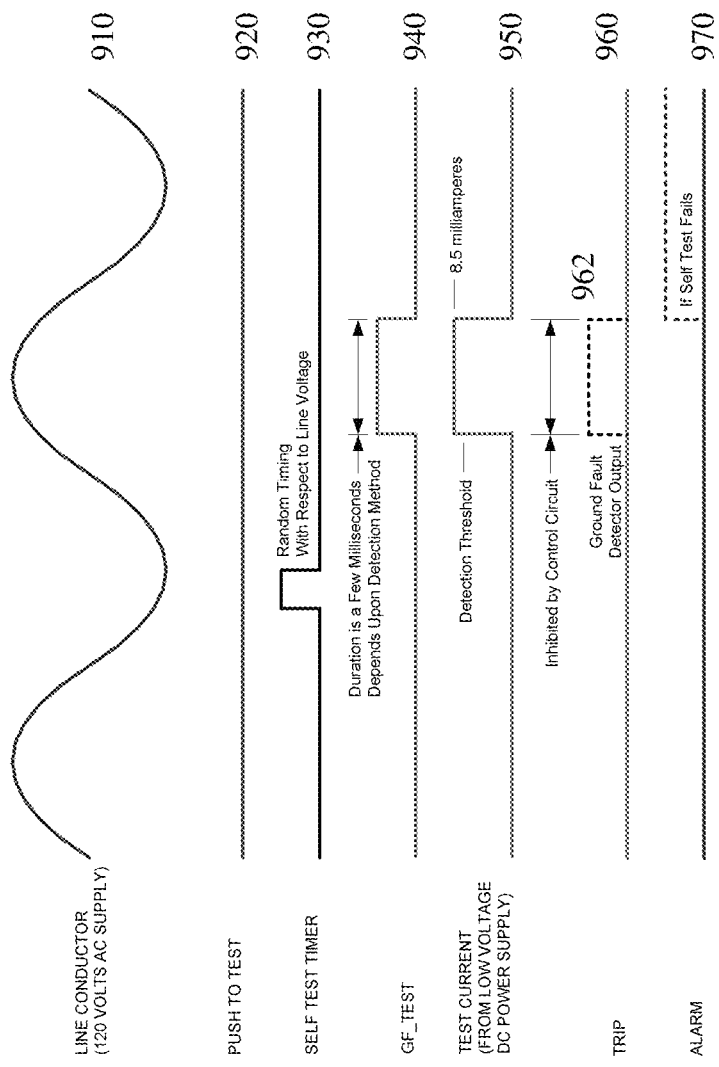
FIG. 9 illustrates a signal timing diagram of an automatic self test for the GFCI device according to the embodiment of FIG. 7.

FIG. 9 illustrates a signal timing diagram of an automatic self test for the GFCI device 700 according to the embodiment of FIG. 7. In particular, FIG. 9 shows the line conductor signal 910 of the 120 volts AC power supply 701, the push-to-test signal 920, the self test timer signal 930, the GF_TEST signal 940, the test current 950 from the low voltage DC power supply 710, the TRIP signal 960, and the ALARM signal 970 for the case in which the GFCI device 700 performs an automatic self test. Referring to FIGS. 7 and 9, the self test timer 708 transmits a self test timer signal 930 initiating a self test at a random phase of the line conductor signal 910. The GF_TEST signal 940 is then generated by the self test controller 706 and closes the electronic switch 738 resulting in a test current stimulus signal 950 (e.g., 8.5 milliamperes) on wire 736 from the low voltage DC power source 710. The self test controller 706 gates the output signal from the line synchronizer circuit 740 so that the GF_TEST signal is present for only a few milliseconds during the positive half cycle of the line conductor signal 910 of the AC supply 701. This is the optimal time to generate the test current stimulus signal 950. It is to be understood that in an alternative embodiment, the GF_Test signal could be present during the negative half cycle of the line conductor signal, in a case in which the wire conductor 736 is routed in the opposite direction through the toroid 714. Once the test current signal 950 exceeds the detection threshold of the ground fault detector 704, the detector 704 outputs a signal 962 that is inhibited by the self test controller 706 from reaching the TRIP signal output. However, the self test controller 706 utilizes this signal 962 as a self test pass indicator. At the end of the self test period, if the self test passed, the self test controller 706 resets the self test timer 708 and again enables the output of the ground fault detector 704 to the output pin of the ASIC 702. Otherwise, if the self-test fails, the self-test controller 706 outputs an ALARM signal 970 to the alarm circuit 732 to alert the operator of a self test failure.

Figure 10:
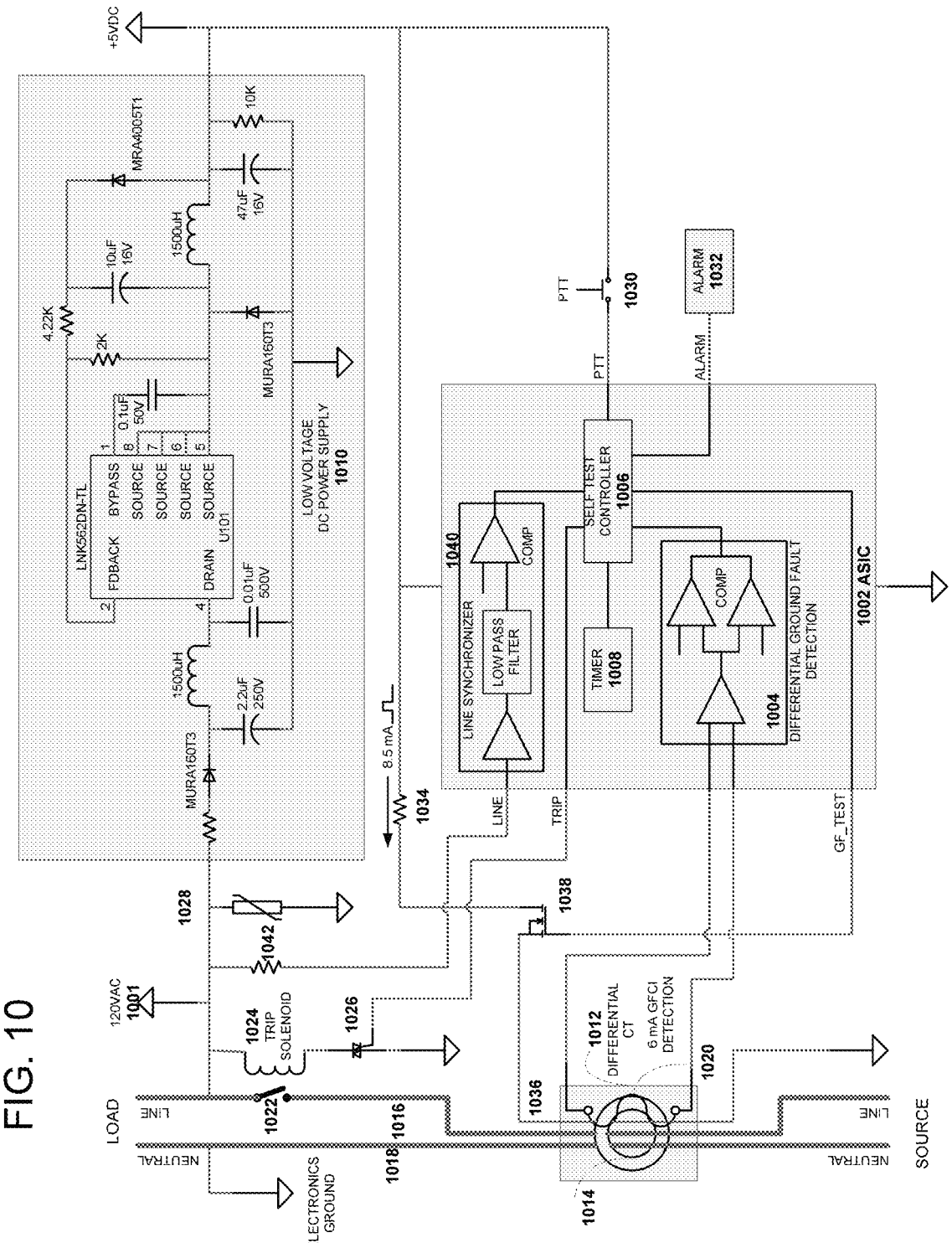
FIG. 10 illustrates a GFCI device according to another embodiment of the present invention.

FIG. 10 illustrates a GFCI device 1000, according to another embodiment of the present invention. It is to be understood that the components 1001-1042 of the GFCI device 1000 of FIG. 10 operate similarly to the respective components 701-742 of the GFCI device 700 of FIG. 7 described above. The elements the supervisory circuit including the electronic switch 1038, the wire conductor 1036 that is routed through the toroid 1014 of the differential current transformer 1012, and the resistor 1034 that sets the amplitude of the test current stimulus signal are connected electrically in series. These elements, which are electrically connected in series, can be electrically connected in any order. For example, the embodiment of FIG. 10 swaps the order of the electronic switch 1038 and the wire conductor 1036 that is routed through the toroid 1014 of the differential current transformer 1012, as compared with the electronic switch (438, 738) and wire conductor (436, 736) in previous embodiments.

Figure 11:
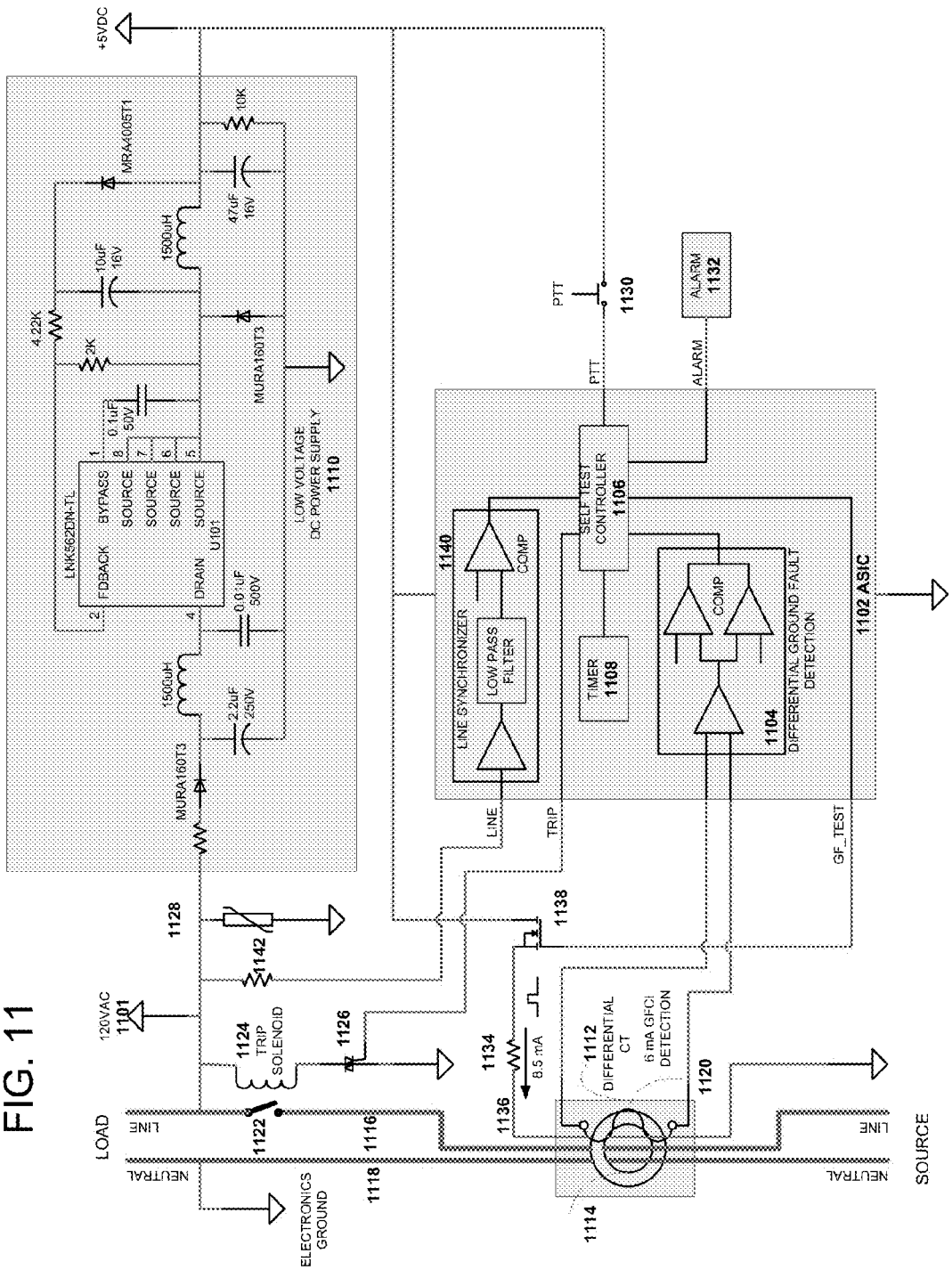
FIG. 11 illustrates a GFCI device according to another embodiment of the present invention.

FIG. 11 illustrates a GFCI device 1100, according to another embodiment of the present invention. It is to be understood that the components 1101-1142 of the GFCI device 1100 of FIG. 11 operate similarly to the respective components 701-742 of the GFCI device 700 of FIG. 7 described above. The embodiment of FIG. 11 swaps the order of the electronic switch 1138 and resistor 1134, as compared with the electronic switch 1038 and resistor 1034 in the embodiment of FIG. 10.

Figure 12:
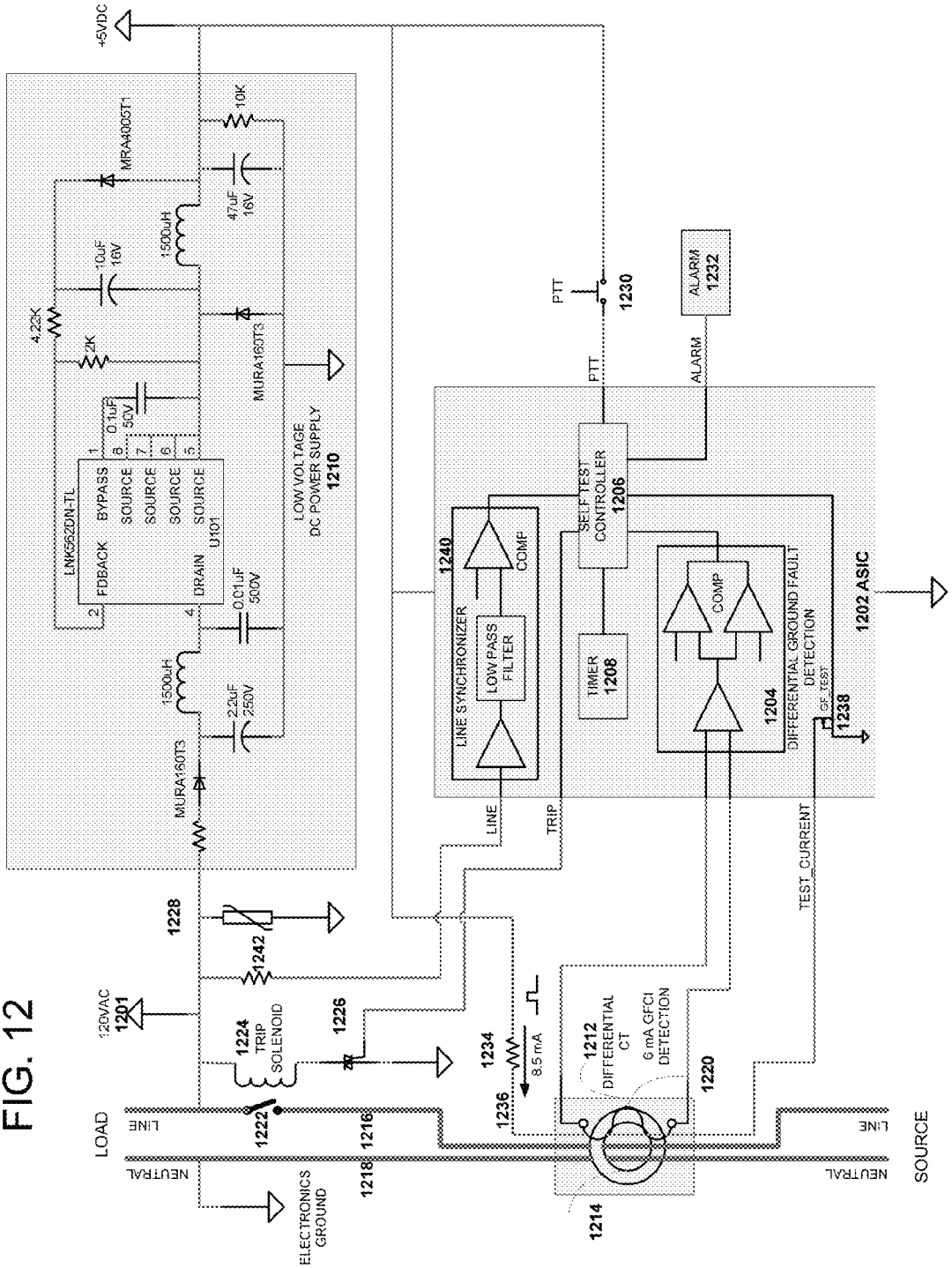
FIG. 12 illustrates a GFCI device according to another embodiment of the present invention.

FIG. 12 illustrates a GFCI device 1200, according to another embodiment of the present invention. It is to be understood that the components 1201-1242 of the GFCI device 1200 of FIG. 12 operate similarly to the respective components 701-742 of the GFCI device 700 of FIG. 7 described above. In the embodiment of FIG. 12, the electronic switch 1238 is integrated into the ASIC 1202. As described above, various embodiments of the present invention enable a low voltage rated electronic switch to be used for the electronic switch 1238. This allows the electronic switch 1238 to be integrated into a low power, low voltage CMOS ASIC 1202, which can reduce cost and board space. In addition, the integration of the electronic switch 1238 into the ASIC 1202 can be done without adding any additional pins to the ASIC 102 by reusing the pin for the GF_TEST signal.

Figure 13:
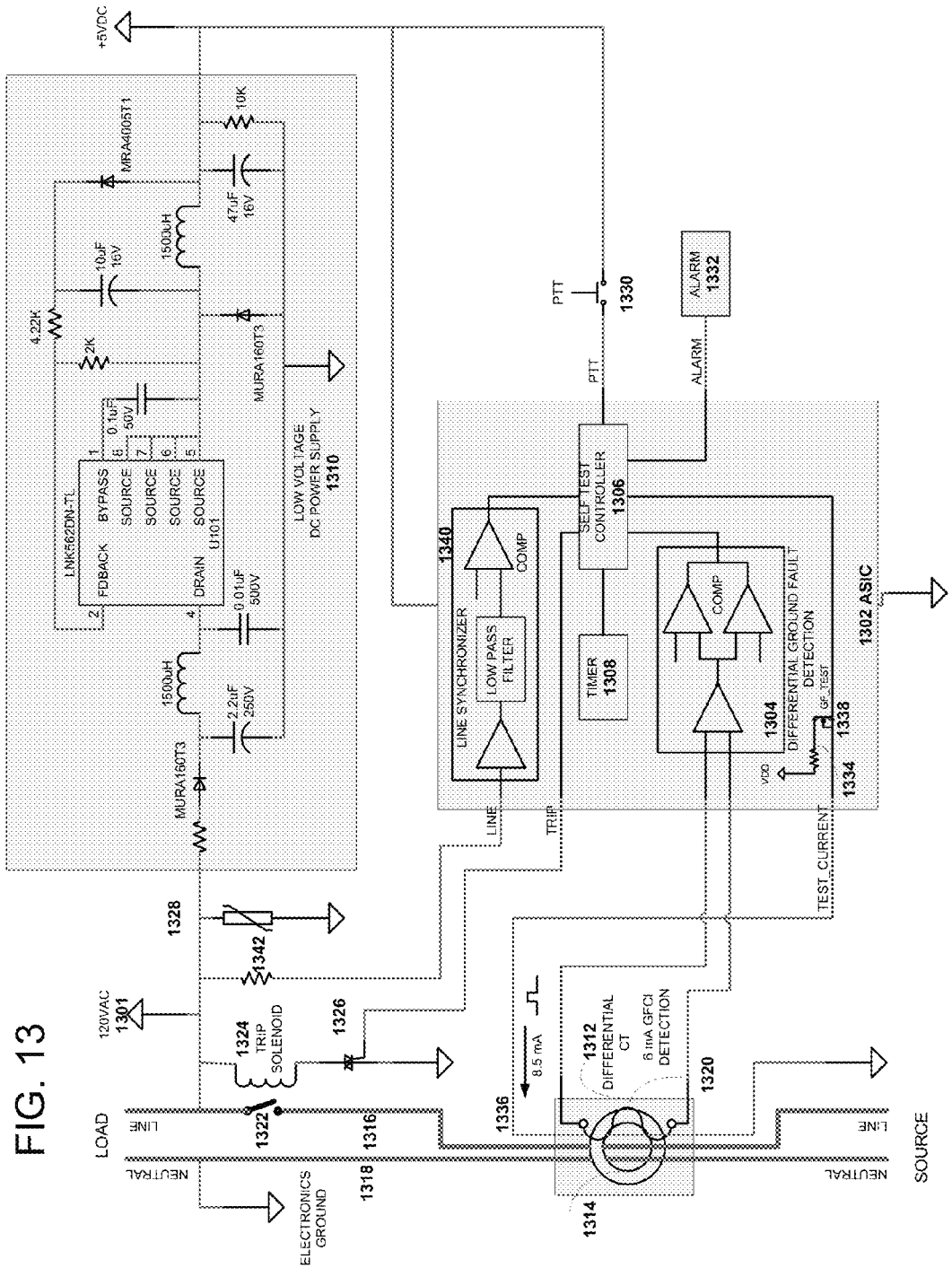
FIG. 13 illustrates a GFCI device according to another embodiment of the present invention.

FIG. 13 illustrates a GFCI device 1300, according to another embodiment of the present invention. It is to be understood that the components 1301-1342 of the GFCI device 1300 of FIG. 13 operate similarly to the respective components 701-742 of the GFCI device 700 of FIG. 7 described above. In the embodiment of FIG. 13, the electronic switch 1338 and the resistor 1234 are integrated into the ASIC 1302. The integration of the resistor 1234 into the ASIC 1202 along with the electronic switch 1338 can result in an additional reduction of cost and board space. As shown in FIG. 13, in this embodiment, the DC test stimulus signal is generated inside the ASIC 1302 from the DC power supplied to the ASIC 1302. Furthermore, although FIG. 13 shows the DC power supply 1310 being separate from the ASCI 1302, the present invention is not limited thereto. In another possible embodiment, the DC power supply circuitry can be included inside the ASIC instead of separate from the ASIC.

Figure 14:
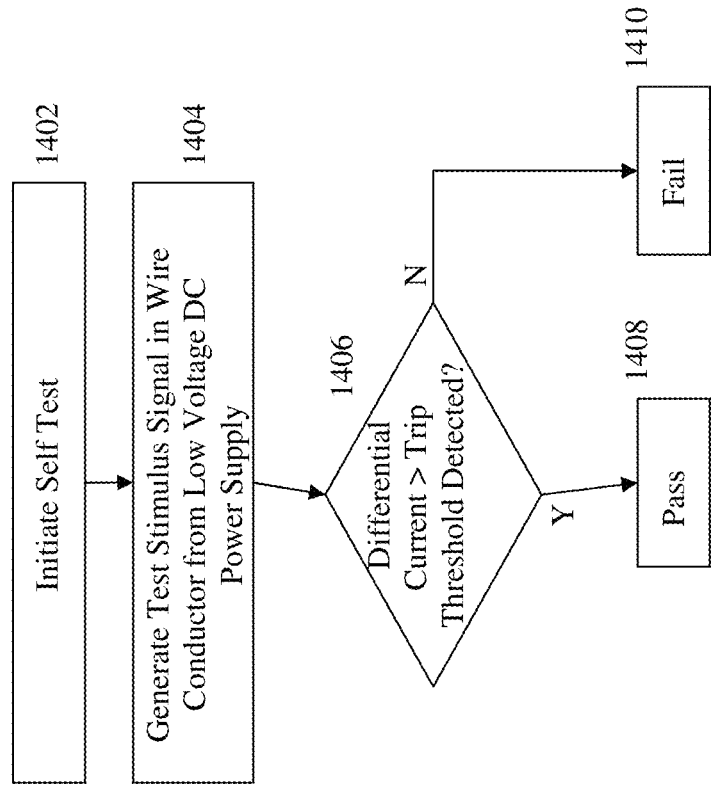
FIG. 14 illustrates a method of performing a self test by a GFCI device according to an embodiment of the present invention.

FIG. 14 illustrates a method of performing a self test by a GFCI device according to an embodiment of the present invention. The method of FIG. 14 can be performed by the GFCI devices illustrated in FIGS. 4, 7, 10, 11, 12, and 13. The self-test can be an automatic self test or a "push-to-test" self test. As illustrated in FIG. 14, at step 1402 the self test is initiated. In the case of the push-to-test self test, the self test is initiated by a user pressing the push-to-test button, which causes the push-to-test signal to be sent to the self test controller. In the case of an automatic self test, the self test timer sends a signal to the self test controller to initiate the self test. At step 1404, a test stimulus signal is generated in the wire conductor routed through the toroid of the differential current transformer from the low voltage DC power source. In particular, the self-test controller can control the electronic switch electrically connected to the wire conductor and the low voltage power supply to close causing the test stimulus signal to flow from the low voltage power supply through the wire conductor, and a resistor can control the amplitude of the test stimulus signal from the low voltage power supply. At step 1406, it is determined whether a differential current exceeding the trip threshold is detected by the differential ground fault detector. At step 1408, if a differential current exceeding the trip threshold is detected at step 1406, the self test passes. In the case of the push-to-test self test, when the differential current exceeding the trip threshold is detected, the TRIP signal is sent to an electronic switch which energizes a trip solenoid that activates the trip armature to open the main contact which interrupts delivery of the AC power in the line conductor. In the case of an automatic self test, when the differential current exceeding the trip threshold is detected, the TRIP signal is suppressed by the self test controller, and the self test timer is reset. At step 1410, if a differential threshold exceeding the trip threshold is not detected at step 1406, the self test fails. In the push-to-test self test, when the self test fails, no TRIP signal is generated and the main contact is not opened, which alerts the user that the test has failed. In the automatic self-test, an alarm signal is sent to the alarm circuit to alert a user that the test has failed.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A ground fault detection device comprising:
    line and neutral conductors configured to connect an AC power source and a load;
    a differential current transformer comprising a toroid, through which the line and neutral conductors pass, and a secondary winding wound on the toroid;
    a differential ground fault detector electrically connected to the secondary winding of the differential current transformer, the differential ground fault detector configured to compare current generated in the secondary winding from an imbalance of magnetic flux in the toroid to a predetermined threshold;
    a wire conductor routed through the toroid of the differential current transformer; and
    a controller configured to control a low voltage DC test stimulus signal to be generated in the wire conductor.

2. The ground fault detection device of claim 1, further comprising:
    a low voltage DC power supply electrically connected to the wire conductor, wherein the controller is configured to control the low voltage DC power supply to generate the test stimulus signal in the wire conductor.

3. The ground fault detection device of claim 1, further comprising:
    an application specific integrated circuit (ASIC), wherein the differential ground circuit fault detector and the controller are included on the ASIC.

4. The ground fault detection device of claim 3, further comprising:
    a low voltage DC power supply electrically connected to the wire conductor to generate the test stimulus signal in the wire conductor, and electrically connected to the ASIC to supply power to the ASIC.

5. The ground fault detection device of claim 1, further comprising:
    an electronic switch electrically connected to the wire conductor and the controller, wherein the controller is configured to control the low voltage DC test stimulus signal to be generated in the wire conductor by transmitting a signal to the electronic switch to close the electronic switch.

6. The ground fault detection device of claim 5, wherein the controller is configured to transmit the signal to the electronic switch to close the electronic switch for at least one complete cycle of the AC power on the line conductor.

7. The ground fault detection device of claim 5, further comprising:
    a line synchronizer electrically connected to the line conductor and the controller and configured to synchronize the controller with the line conductor, wherein the controller is configured to transmit the signal to the electronic switch to close the electronic switch during a positive half cycle of the AC power on the line conductor.

8. The ground fault detection device of claim 5, further comprising:
    a line synchronizer electrically connected to the line conductor and the controller and configured to synchronize the controller with the line conductor, wherein the controller is configured to transmit the signal to the electronic switch to close the electronic switch during a negative half cycle of the AC power on the line conductor.

9. The ground fault detection device of claim 5, further comprising:
    an application specific integrated circuit (ASIC), wherein the differential ground circuit fault detector, the controller, and the electronic switch are included on the ASIC.

10. The ground fault detection device of claim 5, further comprising:
    a resistor electrically connected to the wire conductor, wherein the resistor is configured to set an amplitude of the low voltage DC test stimulus signal.

11. The ground fault detection device of claim 10, further comprising:
    an application specific integrated circuit (ASIC), wherein the differential ground circuit fault detector, the controller, the electronic switch, and the resistor are included on the ASIC.

12. The ground fault detection device of claim 11, the ASIC further includes a low voltage DC power source electrically connected to at least one of the electronic switch and the resistor and configured to generate the low voltage DC test stimulus signal in the wire conductor.

13. The ground fault detection device of claim 1, further comprising:
    a push-to-test button, electrically connected to the controller and configured to transmit a signal to the controller in response to a user pressing the push-to-test button, wherein the controller is configured to control the low voltage DC test stimulus signal to be generated in the wire conductor in response to receiving the signal from the push-to-test button.

14. The ground fault circuit interrupt device of claim 1, further comprising:
    a self test timer electrically connected to the controller and configured to automatically transmit a signal to the controller, wherein the controller is configured to control the low voltage DC test stimulus signal to be generated in the wire conductor in response to receiving the signal from the self-test timer.

15. The ground fault detector device of claim 1, wherein the differential ground fault detector is configured to transmit a trip signal to the controller in response to detecting that the current on the secondary windings is greater than the predetermined threshold.

16. The ground fault detector device of claim 15, further comprising:
    an alarm circuit configured to generate an alert that the ground fault circuit interrupt device is defective, wherein the controller is configured to transmit an alarm signal to the alarm circuit when the test current stimulus signal is generated in the wire conductor and the trip signal is not received from the differential ground fault detector.

17. A method of performing a self test by a ground fault circuit interrupt device, comprising:
generating a low voltage DC test stimulus signal in a wire conductor routed through a toroid of a differential current transformer; and
determining whether a differential current greater than a predetermined threshold is detected in the toroid.

18. The method of claim 17, further comprising:
receiving push-to-test signal from a push-to-test button, wherein the step of generating a low voltage DC test stimulus signal is performed in response to receiving the push-to-test signal.

19. The method of claim 18, further comprising:
if the differential current greater than the predetermined threshold is detected in the toroid, tripping a main contact switch of the ground fault circuit interrupt device.

20. The method of claim 17, further comprising:
receiving a self test timer signal from a self test timer, wherein the step of generating a low voltage DC test stimulus signal is performed in response to receiving the self test timer signal.

21. The method of claim 20, further comprising:
if the differential current greater than the predetermined threshold is detected in the toroid, suppressing a trip signal that trips a main contact switch of the ground fault circuit interrupt device and resetting the self test timer; and
if the differential current greater than the predetermined threshold is not detected in the toroid, generating an alarm to alert a user that the ground fault circuit interrupt device is defective.

22. The method of claim 17, wherein the step of generating a low voltage DC test stimulus signal in a wire conductor routed through a toroid of a differential current transformer comprises:
generating the low voltage DC test stimulus signal in the wire conductor during a portion of a positive half cycle of an AC power signal in a line conductor of the ground fault circuit interrupt device.

23. The method of claim 17, wherein the step of generating a low voltage DC test stimulus signal in a wire conductor routed through a toroid of a differential current transformer comprises:
generating the low voltage DC test stimulus signal in the wire conductor during a portion of a negative half cycle of an AC power signal in a line conductor of the ground fault circuit interrupt device.

24. A ground fault detection device comprising:
means for generating a low voltage DC test stimulus signal in a wire conductor routed through a toroid of a differential current transformer; and
means for determining whether a differential current greater than a predetermined threshold is detected in the toroid.

25. The ground fault detection device of claim 24, wherein the means for generating a low voltage DC test stimulus signal comprises:
means for generating the low voltage DC test stimulus signal in response to receiving a push-to-test signal from a push-to-test button.

26. The ground fault detection device of claim 25, further comprising:
means for tripping a main contact switch when the differential current greater than the predetermined threshold is detected in the toroid.

27. The ground fault detection device of claim 24, wherein the means for generating a low voltage DC test stimulus signal comprises:
means for generating the low voltage DC test stimulus signal in response to receiving a self test timer signal from a self test timer.

28. The ground fault detection device of claim 27, further comprising:
means for suppressing a trip signal that trips a main contact switch when the differential current greater than the predetermined threshold is detected in the toroid; and
means for generating an alarm to alert a user that the ground fault circuit interrupt device is defective when the differential current greater than the predetermined threshold is not detected in the toroid.

29. The ground fault detection device of claim 24, wherein the means for generating a low voltage DC test stimulus signal in a wire conductor routed through a toroid of a differential current transformer comprises:
means for generating the test stimulus signal in the wire conductor from the low voltage DC power supply during a portion of a positive half cycle of an AC power signal in a line conductor of the ground fault circuit interrupt device.

30. The ground fault detection device of claim 24, wherein the means for generating a low voltage DC test stimulus signal in a wire conductor routed through a toroid of a differential current transformer comprises:
means for generating the test stimulus signal in the wire conductor from the low voltage DC power supply during a portion of a negative half cycle of an AC power signal in a line conductor of the ground fault circuit interrupt device.

* * * * *